G. P. WERN.
AUTOMATIC CONTROL FOR A BAND BRAKE.
APPLICATION FILED FEB. 26, 1912. RENEWED FEB. 2, 1914.
1,109,382.
Patented Sept. 1, 1914.
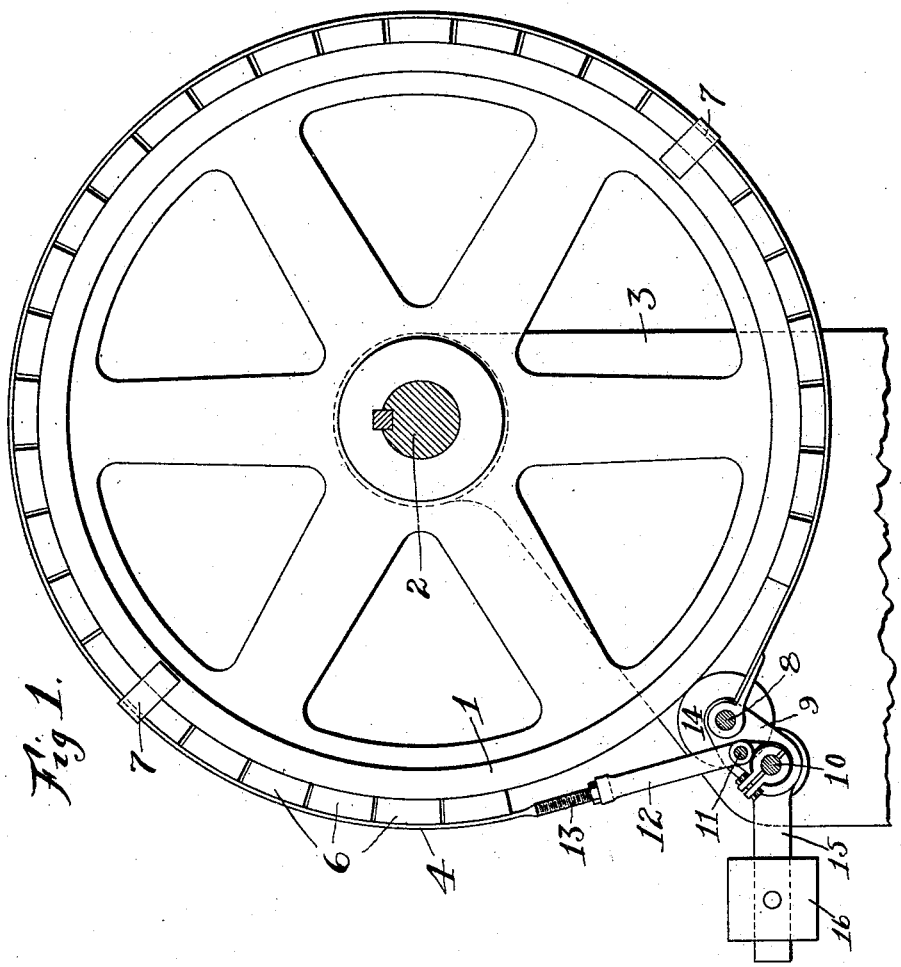
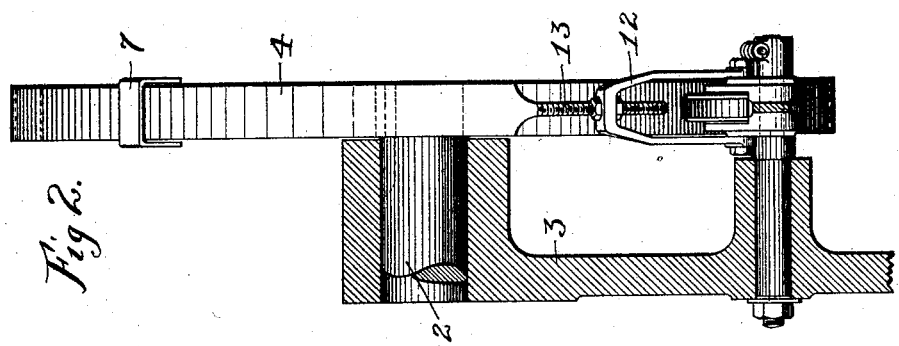
WITNESSES:
Henry R. Evans
Benj. H. Lewis
INVENTOR.
Gustav P. Wern
BY Lewis J. Doolittle
ATTORNEY.

UNITED STATES PATENT OFFICE.

GUSTAV PERS. WERN, OF NEW YORK, N. Y.

AUTOMATIC CONTROL FOR A BAND-BRAKE.

1,109,382. Specification of Letters Patent. Patented Sept. 1, 1914.

Application filed February 26, 1912, Serial No. 680,065. Renewed February 2, 1914. Serial No. 816,088.

*To all whom it may concern:*

Be it known that I, GUSTAV P. WERN, a citizen of the United States, and resident of the city, county, and State of New York, have invented certain new and useful Improvements in Automatic Control for a Band-Brake, of which the following is a specification.

This invention relates to brake construction and more particularly to an automatic controlling mechanism adapted to operate in conjunction therewith.

The object of the invention is to provide a device which may be used in connection with a band brake which shall automatically release the same to permit movement of the brake drum in one direction and automatically tighten the band to cause the same to hold the brake drum against movement in the reverse direction.

In carrying out the invention I provide a band brake of ordinary construction in which, however, the band is preferably constructed of spring material which tends to spring away from the periphery of the brake drum. The ends of the brake band are attached to a movable support, the points of attachment having a peculiar arrangement in relation to each other and the member to which the band is attached being provided with beams for moving the same as the brake drum starts to move, as will be more fully explained hereinafter.

In the drawings accompanying this specification I have illustrated my invention in a simple form, omitting the mechanism with which the brake drum is connected.

In the drawings like parts in the several views have been given similar reference numerals.

Figure 1 is a side elevation of a brake embodying the invention. Fig. 2 is an edgewise view, partially in section, of Fig. 1.

A brake drum 1 is mounted upon a shaft 2 which is connected with the mechanism to be controlled by the brake, all of which may be mounted upon a suitable support or frame such as 3. A brake band 4 surrounds the periphery of the brake drum 1 and may be provided with suitable contact members such as 6 and guides 7. This brake band 4 is preferably constructed of spring steel or other suitable material which tends to spring outwardly when loosened and so free the contact members 6 from engagement with the drum 1. One end of the brake band 4 is attached at 8 to an arm 9 which is mounted and free to move upon a support 10 secured to the frame 3. The opposite end of the brake band 4 is secured at 11 to the movable member 9 by means of the yoke 12 and the adjustable screw threaded connection 13. A rotatable member 14, preferably of yielding material such as rubber or leather, is mounted upon the movable member 9 with its periphery in engagement with the periphery of the brake drum 1. An extending arm 15 carrying an adjustable weight 16 is attached to the movable member 9.

On account of the engagement between the rotatable member 14 and the brake drum 1 it will be seen that a movement of the brake drum 1 in either direction will be transmitted to the movable member 9, causing the same to swing or tend to swing about its support 10 in the direction of such movement. This movement of the member 9 moves the supports 8 and 11, but as these supports are different distances from the center 10 about which they are moved, it will be seen that the same angular movement of the member 9 produces a greater linear movement of the supporting point 8 than of the support 11 and the relative position of these points of support increases the difference in effective linear motion, as to the tightening or loosening of the brake band 4. It will thus be seen that a clockwise movement of the brake drum 1 will cause a tightening of the brake band 4 through the movement transmitted to the support 8. This tightening of the brake band 4 causes the same to operate to grip the brake drum and prevent further movement in this direction. Should the brake drum 1 be moved in a counter-clockwise direction the brake band 4 would be loosened by reason of the greater linear movement of the support 8 over the support 11 and this loosening permits the brake band 4 to spring away from the brake drum 1, thus releasing the same and preventing a free movement in this direction.

The purpose of the arm 15 and adjustable weight 16 is to keep the brake normally in position to grip the brake drum 1 and prevent movement in a clockwise direction. This part of the device may be dispensed with, however, where a similar movement of the brake drum in taking up the looseness of the brake band would not interfere with the operation of the mechanism controlled thereby. The adjustable connection 13 permits the band to be adjusted upon the drum for clearance and also to take up wear and stretching of the parts.

It will thus be seen that I have provided a simple and efficient automatic control for a band brake which may be used in connection with various mechanisms.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. In a device of the character described, in combination, a brake drum, a brake band surrounding said drum, a pivotally mounted movable member to which the ends of said band are attached at different distances from said pivot, and a resilient rotary member mounted upon said movable member in engagement with said drum whereby the initial movement of said drum is transmitted to said movable member and tightens or releases said band and means for normally maintaining said resilient rotary member in engagement with the drum.

2. In a device of the character described, in combination, a brake drum, a brake band surrounding said drum, a pivotally mounted movable member to which the ends of said band are attached at different distances from said pivot, and a resilient rotary member mounted upon said movable member at the end opposite its pivot and in engagement with said drum whereby the initial movement of said drum is transmitted to said movable member and tightens or releases said band.

Signed at New York city, N. Y., in the county and State of New York, this 20th day of February, 1912.

GUST. PERS. WERN.

Witnesses:
LEWIS J. DOOLITTLE,
RUTH WILLINSKY.

Copies of this patent may be obtained for five cents each, by addressing the "Commissioner of Patents, Washington, D. C."